United States Patent
Han

(10) Patent No.: US 7,353,109 B2
(45) Date of Patent: Apr. 1, 2008

(54) DISPLAY METHOD AND APPARATUS FOR NAVIGATION SYSTEM FOR PERFORMING CLUSTER SEARCH OF OBJECTS

(75) Inventor: Maung W. Han, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 602 days.

(21) Appl. No.: 10/772,499

(22) Filed: Feb. 5, 2004

(65) Prior Publication Data

US 2005/0177303 A1    Aug. 11, 2005

(51) Int. Cl.
*G08G 1/123*    (2006.01)
(52) U.S. Cl. .................... 701/209; 340/995.1
(58) Field of Classification Search ............... 701/209, 701/208, 211, 212; 340/995.1, 995.13, 995.14, 340/995.15, 995.17, 995.18, 995.19; 345/629, 345/634
See application file for complete search history.

(56) References Cited

U.S. PATENT DOCUMENTS

| | | | | |
|---|---|---|---|---|
| 5,470,233 A | * | 11/1995 | Fruchterman et al. | 434/112 |
| 7,076,505 B2 | * | 7/2006 | Campbell | 707/104.1 |
| 2002/0065605 A1 | | 5/2002 | Yokota | |
| 2003/0231208 A1 | * | 12/2003 | Hanon et al. | 345/764 |
| 2004/0107205 A1 | * | 6/2004 | Burdick et al. | 707/102 |
| 2004/0243307 A1 | * | 12/2004 | Geelen | 701/213 |

\* cited by examiner

*Primary Examiner*—Dalena Tran
(74) *Attorney, Agent, or Firm*—Muramatsu & Associates

(57) ABSTRACT

A method and apparatus for a navigation system conducts a data search for finding relative density of objects such as points of interest in a specified area and displays the result of the search in various manners. The display method includes the steps of: defining a size and shape of a search template; scanning the search template on the search area by displacing its position by a predetermined increment; counting and recording a number of objects on the search area within the search template at every increment of the displacement position, thereby creating an object distribution matrix; applying a cluster search algorithm to the object distribution matrix, thereby detecting distribution of clusters of the objects; and displaying the clusters of the objects in the search area.

28 Claims, 16 Drawing Sheets

Fig. 1A
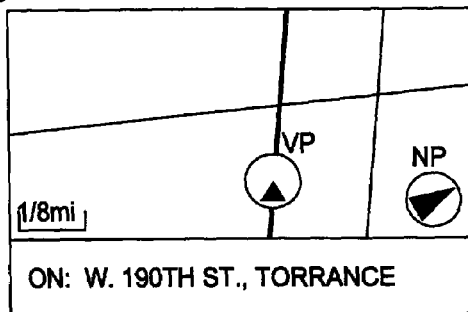
Fig. 1B
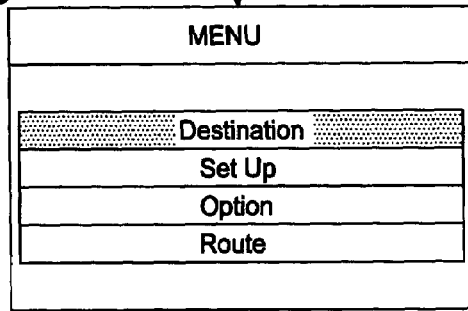
Fig. 1C
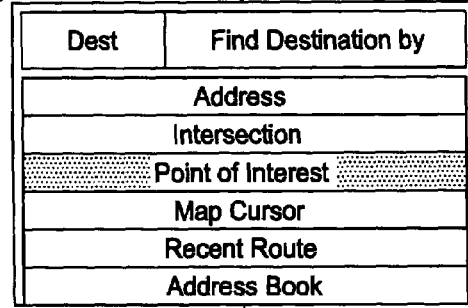
Fig. 1D
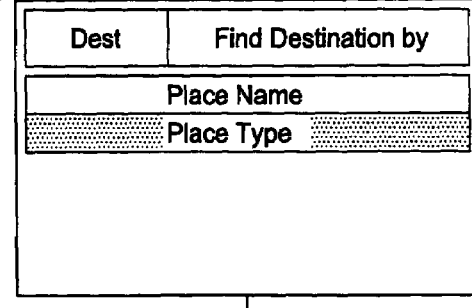
Fig. 1E
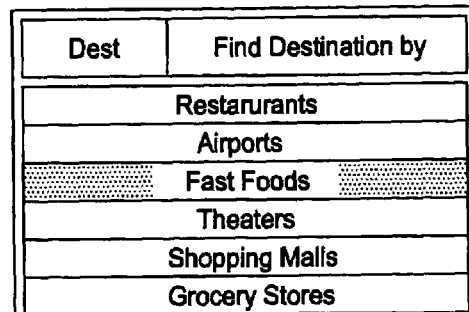
Fig. 1F
| Fast Foods | Hit 397 |
|---|---|
| Burger King | 1.23mi |
| Carl's Jr. | 1.45mi |
| Kentrucky Fried Chicken | 1.69mi |
| Pizza Hut | 2.21mi |
| Del Taco | 2.67mi |
Fig. 1G
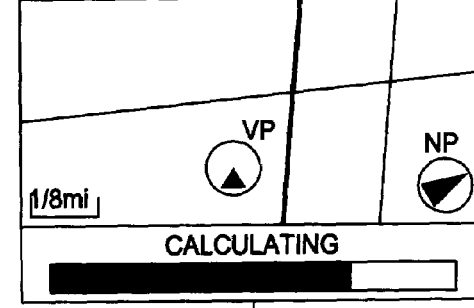
Fig. 1H
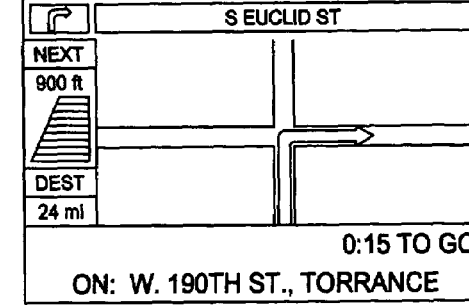

| Dest | Select Place Name | | |
|---|---|---|---|
| 9— | Wendy's | 1.2mi | ↗ |
| | McDonald's | 1.3mi | ↗ |
| 9— | Taco Bell | 1.7mi | ↘ |
| | Sam Woo Restaurant | 2.3mi | ↑ |
| 9— | Citylight Hamberger | 2.5mi | ↗ |
| 9— | Joe's Barbecue | 3.2mi | ↘ |

Fig. 9A — 100

| 1 | 1 | 2 | 3 | 1 | 2 | 2 | 1 | 1 | 0 | 1 | 2 | 1 | 1 |
|---|---|---|---|---|---|---|---|---|---|---|---|---|---|
| 2 | 1 | 1 | 2 | 2 | 1 | 2 | 1 | 0 | 3 | 5 | 4 | 3 | 2 |
| 3 | 2 | 3 | 3 | 5 | 2 | 1 | 1 | 0 | 0 | 3 | 4 | 2 | 1 |
| 1 | 2 | 2 | 2 | 2 | 1 | 1 | 0 | 0 | 0 | 1 | 2 | 1 | 0 |
| 2 | 3 | 5 | 1 | 1 | 1 | 0 | 0 | 0 | 0 | 0 | 1 | 0 | 0 |
| 1 | 2 | 2 | 1 | 1 | 1 | 1 | 0 | 0 | 0 | 1 | 2 | 1 | 0 |

Fig. 9B — 100, with regions 209(1), 209(2), 209(3), 209(5), 209(6)

| 1 | 1 | 2 | ③ | 1 | 2 | 2 | 1 | 1 | 0 | 1 | 2 | 1 | 1 |
|---|---|---|---|---|---|---|---|---|---|---|---|---|---|
| 2 | 1 | 1 | 2 | 2 | 1 | 2 | 1 | 0 | 3 | ⑤ | 4 | 3 | 2 |
| ③ | 2 | 3 | 3 | ⑤ | 2 | 1 | 1 | 0 | 0 | 3 | 4 | 2 | 1 |
| 1 | 2 | 2 | 2 | 2 | 1 | 1 | 0 | 0 | 0 | 1 | 2 | 1 | 0 |
| 2 | 3 | ⑤ | 1 | 1 | 1 | 0 | 0 | 0 | 0 | 0 | 1 | 0 | 0 |
| 1 | 2 | 2 | 1 | 1 | 1 | 1 | 0 | 0 | 0 | 1 | ② | 1 | 0 |

Fig. 9C — 100

| 1 | 1 | - | X | - | 2 | 2 | 1 | 1 | - | - | - | 1 | 1 |
|---|---|---|---|---|---|---|---|---|---|---|---|---|---|
| - | - | - | - | - | 1 | 2 | 1 | 0 | - | X | - | 3 | 2 |
| X | - | 3 | - | X | - | 1 | 1 | 0 | - | - | - | 2 | 1 |
| - | - | - | - | - | 1 | 1 | 0 | 0 | 0 | 1 | 2 | 1 | 0 |
| 2 | - | X | - | 1 | 1 | 0 | 0 | 0 | 0 | - | - | - | 0 |
| 1 | - | - | - | 1 | 1 | 1 | 0 | 0 | 0 | - | X | - | 0 |

Fig. 9D

|   |   |   |   |   |   |   |   |   |   |   |   |   |
|---|---|---|---|---|---|---|---|---|---|---|---|---|
| 1 | 1 | - | X | - | 2 | 2 | 1 | 1 | - | - | - | - |
| - | - | - | - | - | - | 2 | 1 | 0 | - | X | - | 3 | 2 |
| X | - | 3 | - | X | - | 1 | 1 | 0 | - | - | 2 | 1 |
| - | - | - | - | - | - | 1 | 0 | 0 | 0 | 1 | 2 | 1 | 0 |
| 2 | - | X | - | 1 | 1 | 0 | 0 | 0 | 0 | - | - | - | 0 |
| 1 | - | - | - | 1 | 1 | 1 | 0 | 0 | 0 | - | X | - | 0 |

Fig. 9E

|   |   |   |   |   |   |   |   |   |   |   |   |   |
|---|---|---|---|---|---|---|---|---|---|---|---|---|
| 1 | 1 | - | X | - | 2 | 2 | 1 | 1 | - | - | - | - |
| - | - | - | - | - | - | 2 | 1 | 0 | - | X | - | X | - |
| X | - | X | - | X | - | 1 | 1 | 0 | - | - | - | - |
| - | - | - | - | - | - | 1 | 0 | 0 | 0 | 1 | 2 | 1 | 0 |
| X | - | X | - | 1 | 1 | 0 | 0 | 0 | 0 | - | - | - | 0 |
| - | - | - | - | 1 | 1 | 1 | 0 | 0 | 0 | - | X | - | 0 |

| Fast Food Restaurants | | Cluster Search |
|---|---|---|
| Cluster Center Place | Cluster Size | Distance Direction |
| 1  Taco Bell | 14 | 1.7mi ↗ |
| 2  Wendy's | 13 | 3.3mi ↘ |
| 3  McDonald's | 12 | 1.3mi ↖ |
| 4  Sam Woo Restaurant | 9 | 2.3mi ↑ |
| 5  Citylight Hamberger | 5 | 1.9mi ↗ |
| 6  Joe's Barbecue | 3 | 3.2mi ↘ |
| List Within Cluster | | View on Map |

Fig. 11A

| Fast Food Restaurants | | Cluster Search | |
|---|---|---|---|
| Cluster Center Place | Cluster Size | Distance | Direction |
| 1  Taco Bell | 14 | 1.7mi | ↗ |
| 2  Wendy's | 13 | 3.3mi | ↗ |
| 3  McDonald's | 12 | 1.3mi | ↘ |
| 4  Sam Woo Restaurant | 9 | 2.3mi | ↑ |
| 5  Citylight Hamberger | 5 | 1.9mi | ↗ |
| 6  Joe's Barbecue | 3 | 3.2mi | ↘ |
| List Within Cluster | | View on Map | |

Fig. 11B

| Custer No. 2: Size 13 | | |
|---|---|---|
| | Distance from Center | Direction |
| Wendy's | 0.0mi | ↗ |
| KK Stakehouse | 0.1mi | ↗ |
| Tip Top Pretzel | 0.1mi | ↘ |
| McDonald's | 0.2mi | ↑ |
| KFC | 0.3mi | ↗ |
| Dunkin Donuts | 0.4mi | ↘ |

DISPLAY METHOD AND APPARATUS FOR NAVIGATION SYSTEM FOR PERFORMING CLUSTER SEARCH OF OBJECTS

FIELD OF THE INVENTION

This invention relates to a display method and apparatus for a navigation system, and more particularly, to a display method and apparatus for a navigation system for searching and displaying objects such as points of interest (POI) within a specified search area, which is capable of detecting the density of the objects, i.e, clusters of the objects, and displaying the cluster information in various manners convenient to a user.

BACKGROUND OF THE INVENTION

A navigation system performs travel guidance for enabling a user to easily and quickly reach the selected destination. A typical example is a vehicle navigation system where a user drives a car equipped with a navigation function. Such a navigation system detects the position of the user or user's vehicle, and reads out map data pertaining to an area at the current vehicle position from a data storage medium, for example, a CD-ROM (compact disc read-only memory), a DVD (digital versatile disc), or a hard disc. Alternatively, such map data can be provided to the user from a remote server through a communication network such as Internet. The navigation system displays a map image on a monitor screen while superimposing a mark representing the current location of the user on the map image.

When a destination is set, the navigation system starts a route guidance function for setting a guided route from the start point to the destination. To determine the guided route to the destination, the navigation system calculates and determines an optimum route to the destination based on various parameters. For example, the guided route is determined based on the shortest way to reach the destination, the route preferring freeways to surface roads, the least expensive way to the destination, the route without using toll road, or the like.

During the route guidance, the navigation system reads the nodes data from the data storage medium such as DVD and successively stores the nodes data of road segments (expressed in longitude and latitude) constituting the guided route in a map memory. In the actual traveling, the node series stored in the map memory is searched for a portion of the guided route to be displayed in a map display area of the monitor screen, and the portion of the guided route is highlighted to be clearly distinguished from other routes. When the vehicle is within a predetermined distance of an intersection it is approaching, an intersection guidance diagram (an enlarged or highlighted intersection diagram with an arrow indicating the direction in which the vehicle is to turn at the intersection) is displayed to inform a user of the desired one of roads or directions selectable at the intersection. Such route guidance by the navigation system is also given by voice instruction.

FIGS. 1A-1H show an example of overall procedure and screen display involved in the navigation system to obtain a maneuver guidance information screen. FIG. 1A shows an example of locator map screen of the navigation system when the destination is not specified. Typically, the navigation system displays a street on which the vehicle (current vehicle position VP) is running on a map image and a name of the street. Other information such as a north pointer NP, a map scale and a current time may also be illustrated on the display screen.

An example of process for specifying a destination in the navigation system through a Point of Interest (POI) search method is shown in FIGS. 1B-1F. A main menu screen such as shown in FIG. 1B displays menu items including a "Destination" menu for entering the destination. When selecting "Destination", the navigation system displays a "Find Destination by" screen as shown in FIG. 1C for specifying an input method for selecting the destination. The "Find Destination By" screen lists various methods for selecting the destination including "Address" for specifying the city and address of the destination, "Intersection" for specifying the names of two streets which intersect with one another, and "Point of Interest (POI)" for selecting the programmed destination based on the name, category or telephone number.

When selecting, the "Point of Interest" method in FIG. 1C, the navigation system displays selection methods of point of interest (POI) either by "Place Name" or "Place Type" in FIG. 1D. The "Place Name" is to specify a name of POI, and the "Place Type" is to specify a category of POI. If the "Place Type" is selected in FIG. 1D, the navigation system lists categories of POIs as shown in FIG. 1E. The user selects a desired category of POIs from the lists.

FIG. 1F shows a screen when the user has selected a "Fast Foods" category in the example of FIG. 1E. In this example, the screen includes the name of POI type "Fast Foods" at the top and a list of names of the fast food restaurants typically sorted by distance from the current destination. The user selects a particular restaurant among the restaurant lists for route guidance. In FIG. 1G, the navigation system calculates an optimum route to the selected destination. After determining the guided route, the navigation system starts the route guidance as shown in FIG. 1H. Typically, the navigation system shows the intersection that is highlighted to show the next turn and a direction of the turn.

FIG. 2 shows an example of a display listing a selected type of POI place names, in this case, fast food restaurants. It should be noted that although the present invention is not limited to the application of finding POIs, an example of disadvantages in the conventional technology will be described for the case involved with selecting one of POIs for simplicity of explanation. In the conventional technology, such POI names are listed in the alphabetical order or in the order of distance from the user's present location. Further in the conventional technology, such POIs are evaluated one by one and sorted one by one to be listed in the specified order as noted above.

In an actual use of a navigation system, a user does not necessarily know exactly which POI such as a fast food restaurant he wants to go. The user may not have decided as to what type of food he wants to eat. In such a case, the user simply wants to go to a location where many fast food restaurants are located so that he can choose one of the fast food restaurants he wants at the location. The user may want to compare outside appearances or displays of the restaurants to see which restaurant seems to offer foods or atmosphere to his preference.

FIG. 3 shows the condition where the user may prefer to travel a longer distance to go to a location where points of interest are clustered. Reference numbers 103 indicate the locations of POIs of the selected type on the digitized image map. A reference mark 105 indicates the present location of the user. In terms of distance, the user can reach the POI at a location A which is at the shortest distance. However the user can find three POIs at a location B or six POIs at a location C although they are located farther than the location A.

The user may often prefer to go to the location B or C where two or more POIs are clustered especially when the user does not have a specific POI in mind or he wants to decide one by actually seeing it. In the conventional navigation system, the user cannot easily tell whether particular type of POIs are clustered in a particular location. Under the circumstances, there is a need in the navigation system to have a function to search POIs in terms of relative spatial density, i.e., cluster size and location.

SUMMARY OF THE INVENTION

It is, therefore, an object of the present invention to provide a display method and apparatus for a navigation system which is able to perform a cluster search for searching objects based on their relative density or cluster size within a selected search area.

It is another object of the present invention to provide a display method and apparatus for a navigation system which is able to perform a cluster search for searching POIs (points of interest) based on their relative density or cluster size within a selected search area and to sort the locations of the clusters based on the degree of density, i.e., cluster size or the distance from the user.

It is a further object of the present invention to provide a display method and apparatus for a navigation system which is able to perform a cluster search for POIs (points of interest) in a selected search area and display the results of the cluster search in a specified format.

It is a further object of the present invention to provide an example of algorithm of a cluster search for use in a navigation system in which the algorithm first produce an object distribution matrix and performs a process of finding relative density of the objects on the object distribution matrix.

The navigation system of the present invention is designed to conduct a data search for finding relative density of objects such as points of interest in a specified area and displays the result of the search in various manners. The navigation system performs the cluster search on the objects and produces a cluster distribution matrix data and sorts the clusters by a predetermine parameter such as a cluster size or a distance from the current user position.

One aspect of the present invention is a display method for searching and displaying objects such as points of interest clustered within a search area. The display method is comprised of the steps of: defining a size and shape of a search template for searching objects in the search area; scanning the search template on the search area by displacing its position by a predetermined increment; counting and recording a number of objects on the search area within the search template at every increment of said displacement position, thereby creating an object distribution matrix; applying a cluster search algorithm to the object distribution matrix, thereby detecting distribution of clusters of the objects in the search area; and displaying the clusters of the objects in the search area by a predetermined display method.

In the display method of the present invention, the predetermined increment for scanning the search template is smaller than the size of the search template so that an area on the search area covered by the search template is overlapped by consecutive increments of the displacement position of the search template. As an example, the search template has a square shape and a side length of the search template is larger than the predetermined increment of displacement by three times or more.

In the display method of the present invention, the cluster search algorithm includes the step of: finding numbers on the object distribution matrix that are larger than any neighboring numbers and recording the higher numbers; temporarily masking the higher numbers on the object distribution matrix and erasing the neighboring numbers from the object distribution matrix; and repeating the above operations until any remaining numbers on the object distribution matrix become equal to or smaller than a predetermined value; and erasing all the remaining numbers and recovering the masked numbers on the object distribution matrix, thereby obtaining distribution of the clusters of the object in the search area.

In the above described cluster search algorithm, the step of finding numbers on the object distribution matrix includes the steps of: selecting a number having a larger sum of neighboring numbers when a number larger than any neighboring numbers is not found; and temporarily masking the selected number on the object distribution matrix and erasing the neighboring numbers from the object distribution matrix.

Further, in the above described search algorithm, the step of finding numbers on the object distribution matrix includes the following steps of: selecting a number having a larger sum of neighboring numbers when a number larger than any neighboring numbers is not found; temporarily masking the selected number on the object distribution matrix and erasing the neighboring numbers from the object distribution matrix; picking one of the numbers having equal sums of neighboring numbers when a number having the larger sum of neighboring numbers is not found; and temporarily masking the picked number on the object distribution matrix and erasing the neighboring numbers from the object distribution matrix.

In the display method of present invention, the step of displaying the clusters of the objects in the search area includes a step of listing the clusters of objects in an order of cluster size where the cluster size is a number of the objects in a small portion in the search area. Further, the step of displaying the clusters of the objects in the search area includes a step of listing the clusters of objects in an order of distance from a user position.

In the display method of present invention, the step of displaying the clusters of the objects in the search area includes a step of listing names of the objects within a specified cluster thereby allowing the user to select one of the objects. Further, the step of listing the names of the objects within the selected cluster includes a step of listing the names in an order of distance from an object at a center of the selected cluster or an alphabetical order of the names of the objects. Further, the step of displaying the clusters of the objects in the search area includes a step of displaying a map image showing distribution of the objects within a selected cluster.

In the display method of present invention, the step of scanning the search template on the search area includes a step of moving the search template from one horizontal end to another horizontal end of the search area and vertically shifting to a next row, and repeating the above movements to cover all the search area to produce the object distribution matrix. Alternatively, the step of scanning the search template on the search area includes a step of moving the search template starting from a center of the search area and spirally moving the search template around the center toward an outer area of the search area. In the spiral scanning operation, the step of applying the cluster search algorithm starts as soon as sufficient data of object distribution at a center portion of the search area is available without waiting for completing the scanning step for all of the search area.

Another aspect of the present invention is a display apparatus for a navigation system for implementing the various steps defined in the display method of the present invention noted above. The display apparatus conducts a cluster search operation for finding relative density of objects such as points of interest in a specified search area and displays the result of the search in various manners. The display apparatus sorts the clusters by a predetermine parameter such as a cluster size or a distance from the current user position.

According to the present invention, the navigation system is able to perform the cluster search for searching objects such as POIs based on their relative spatial density or cluster size within the search area specified by the user. The navigation system displays the results of the cluster search sorted by the cluster size or the distance from the current user location. In response to the request by the user, the navigation system displays a map image of the selected cluster or each name of the POIs within the selected cluster, or the like. In other words, the user can see a distribution of clusters of the POIs within the search area and details of each cluster as to its size, location, map image, and details of each POI in the cluster.

The cluster search of the present invention provides the user a wider choice of destination in such a situation when the user has not a specific place name in mind. For example, there arises a situation where the user wants to eat fast food for lunch but does not have a specific fast restaurant that he really wants to go. In such a case, the navigation system informs the user about the location and size of the cluster having two or more fast food restaurants. The user can select the cluster as his destination so that he can determine which restaurant he likes after arriving at the cluster.

BRIEF DESCRIPTION OF THE DRAWINGS

FIGS. 1A-1H are schematic diagrams showing an example of operational process and screen display involved in the navigation system for selecting a destination.

FIG. 8A shows an example of distribution of points of interest scattered in an arbitrary search area and a search template, and FIG. 8B shows an example of operation for scanning the search template on the search area to count the points of interest within the search template to obtain the POI distribution matrix.

FIGS. 9A-9M are schematic diagrams showing an example of process for conducting the cluster search of points of interest for the search area based on a POI distribution matrix obtained by the process of FIG. 8B. FIG. 9A shows an example of POI distribution matrix on a search area, FIGS. 9A-9K show an example of process of cluster search in the present invention, and FIGS. 9L-9M show images of results of the cluster search.

FIG. 10A is a basic screen display listing the clusters and unique keys for the cluster search, and FIG. 10B is a map image of the cluster selected on the screen of FIG. 10A.

FIGS. 11A-11B show another example of screen display of the navigation system of the present invention illustrating the results of cluster search. FIG. 11A is the basic screen display similar to that of FIG. 10A, and FIG. 11B shows a POI name list within the cluster selected on the screen of FIG. 11A.

FIG. 12A shows a starting point of the search template for conducting the spiral scanning on the search area, and FIG. 12B shows scanning lines or scanning directions involved in the spiral scanning of the present invention.

DETAILED DESCRIPTION OF THE INVENTION

The present invention will be described in detail with reference to the accompanying drawings. The navigation system of the present invention is designed to conduct a data search for finding relative density of objects such as points of interest (POI) in a specified area and displays the result of the search in various manners. Within the context of this invention, such a data search is referred to as a "cluster search" and a specified area for the cluster search is referred to as a "search area".

The cluster search method and apparatus of the present invention detects the relative density of objects within the search area. As noted above, a typical example of the objects is points of interest (POI) which are place names and place types contained in the map data of a navigation system which are similar to those listed in a telephone yellow book. It should be noted that the present invention can also be applied to other objects such as intersections, etc., although the present invention will be describe mainly for the case of searching POIs within a search area.

The navigation system performs the cluster search on the objects such as POTs to produce cluster data (cluster distribution matrix) and sorts the clusters by a predetermine parameter such as a cluster size or a cluster distance from a specified position. The cluster search of the present invention provides the user a wider choice of destination such as when the user has not a specific place name in mind. For example, there arises a case where the user wants to eat fast food but does not have a specific fast restaurant that he really wants to go. In such a case, the navigation system notifies the user a location of the cluster having one or more fast food restaurants or a size of the cluster, etc.

Figure 4:
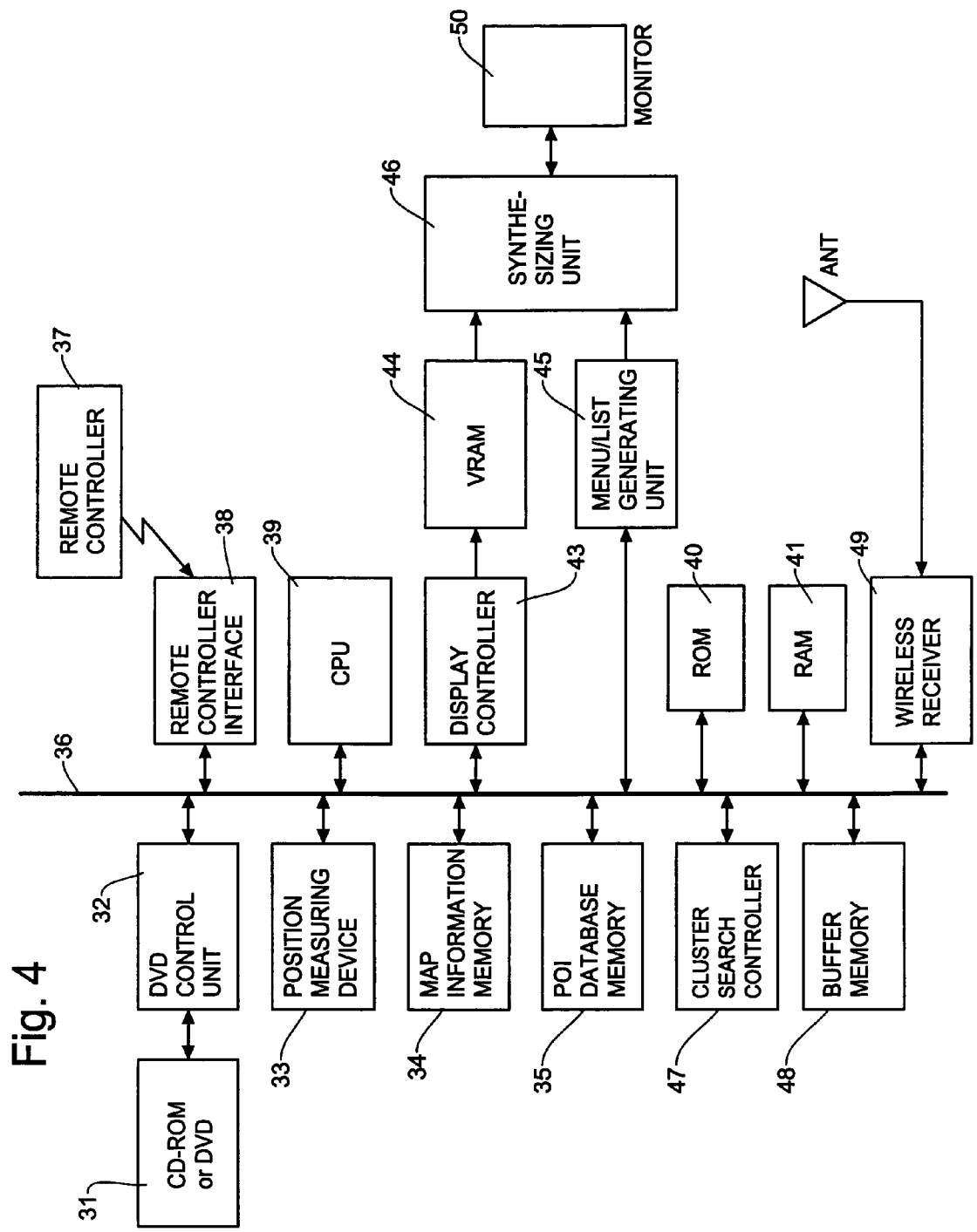
FIG. 4 is a block diagram showing an example of structure in the vehicle navigation system for implementing the present invention for conducting a cluster search of points of interest or other objects and displaying the results of the cluster search in various manners.

The data search method and apparatus of the present invention is advantageously applicable to a vehicle navigation system. FIG. 4 shows an example of structure of a vehicle navigation system implementing the present invention. It should be noted that the present invention can also be applied to a portable navigation device such as a one implemented by a PDA (personal digital assistant) device, a lap-top computer, or other hand-held devices.

In the block diagram of FIG. 4, the navigation system includes a map storage medium 31 such as a CD-ROM, DVD, hard disc or other storage means (hereafter "DVD") for storing map information, a DVD control unit 32 for a controlling an operation for reading the map information from the DVD, a position measuring device 33 for measuring the present vehicle position. The position measuring device 33 has a vehicle speed sensor for detecting a moving distance, a gyroscope for detecting a moving direction, a microprocessor for calculating a position, a GPS receiver, and etc.

The block diagram of FIG. 4 further includes a map information (data) memory 34 for storing the map information which is read out from the DVD 31, a database memory 35 for storing database information such as point of interest (POI) information which is read out from the DVD 31, a remote controller 37 for executing a menu selection operation, an enlarge/reduce operation, a destination input operation, etc. and a remote controller interface 38.

The navigation system further includes a bus 36 for interfacing the above units in the system, a processor (CPU) 39 for controlling an overall operation of the navigation system, a ROM 40 for storing various control programs such as a route search program and a map matching program necessary for navigation control, a RAM 41 for storing a processing result such as a guide route, a display controller 43 for generating a map image (a map guide image and an arrow guide image) on the basis of the map information, a VRAM (Video RAM) 44 for storing images generated by the display controller, a menu/list generating unit 45 for generating menu image/various list images, a synthesizing unit 46, a scroll operation controller 47, a buffer memory 48, a wireless receiver 49, and a monitor (display) 50.

The cluster search operation controller 47 plays an essential role of the present invention for conducting a data search operation for finding relative spatial density of objects such as POIs (points of interest) and displaying the search results. The cluster search operation controller 47 receives map data from the map data storage (DVD) 31, and a cluster search request and information indicating a size and location of the search area from the user through a monitor screen. The cluster search operation controller 47 also receives information indicating the current position of the user from the position measuring device 33.

When receiving the cluster search request, the cluster search operation controller 47 scans a search template on the search area by a predetermined increment (search step). At each increment, the cluster search operation controller 47 counts the number of objects within the search template and stores the counted data. As a result of this scanning, an object distribution matrix of the search area is created to which the cluster search operation controller 47 applies an algorithm to examine the relative density of the objects. The object distribution matrix and other data during the process of cluster search can be stored in the buffer memory 48.

At the end of the cluster search algorithm, the cluster search operation controller 47 obtains resultant data showing the distribution of clusters of the objects in the search area. The cluster search operation controller 47 causes the monitor to display the results of the cluster search sorted by the cluster size or the distance from the current user location. In response to the request from the user, the cluster search operation controller 47 causes the monitor to display a map image of the selected cluster or a name list showing each name of the objects such as POIs within the selected cluster, or the like.

Figure 5:
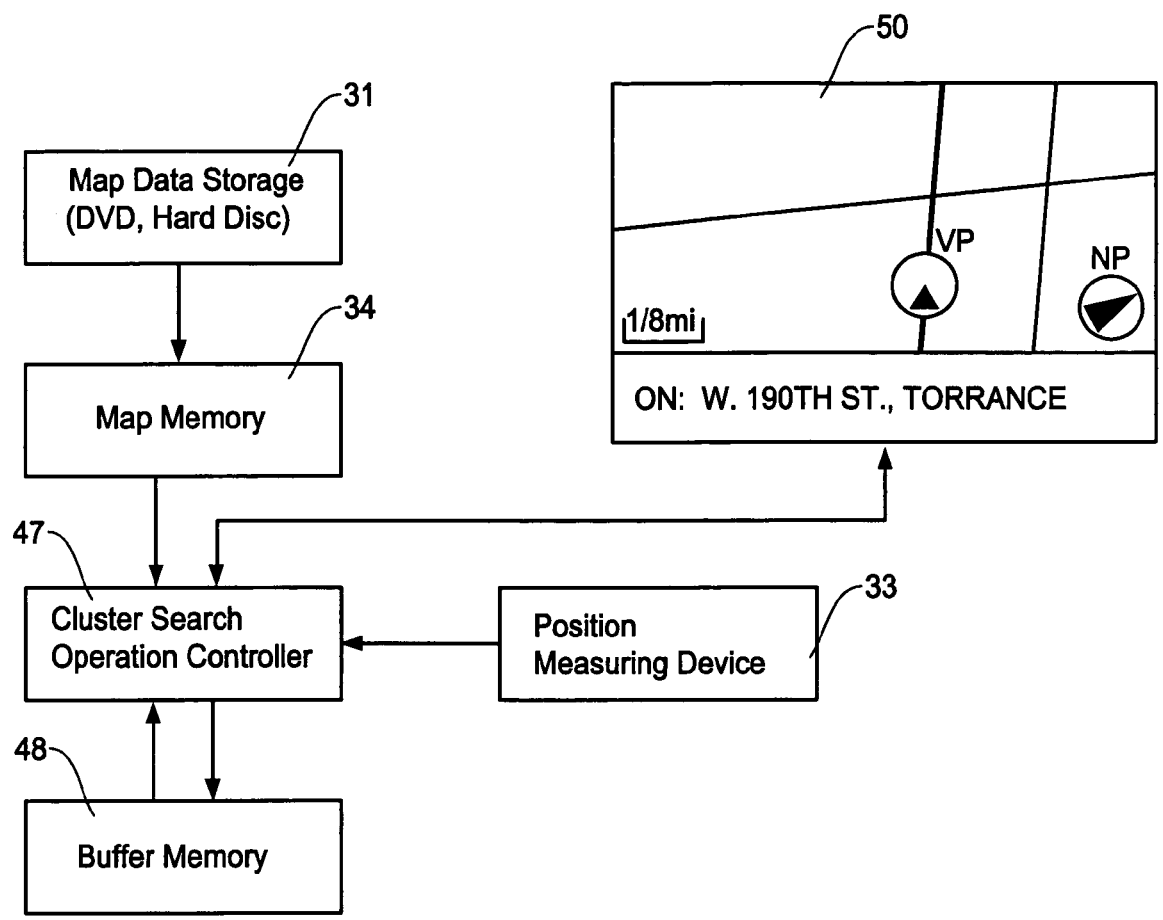
FIG. 5 is a functional block diagram showing a basic structure of the apparatus of the present invention conducting a cluster search of points of interest or other objects and displaying the results of the cluster search in various manner.

FIG. 5 is a functional block diagram showing an example of basic structure of the apparatus of the present invention for conducting the cluster search on objects such as POIs within a specified search area and displaying the search results in various manners. The structure of FIG. 5 is illustrated by the components in the block diagram of FIG. 4 that are directly related to the operation of the present invention. The components of the apparatus of the present invention includes a monitor 50 for interfacing with the user and displaying the search results, and a cluster search operation controller 47 for controlling an overall operation of the apparatus of the present invention.

The block diagram of FIG. 5 further includes a map data storage 31 such as a DVD or a hard disc for storing map data, a map memory 34 for storing map data from the map data storage 31, a position measuring device 33 for detecting a current position of the user, and a buffer memory 48 for temporarily storing various types of data for operation and data processing of the apparatus. In an actual application, the cluster search operation controller 47 can be implemented by the CPU 39 in FIG. 4 or by a separate controller such as a microprocessor. Further, the buffer memory 48 can be implemented by RAM 41 in FIG. 4 or other memory.

At the start of the cluster search, the user specifies a search area such as a city or a downtown area or the like for finding clusters of objects such as POIs. In the case of POIs, typically, the user selects a type of POIs such as fast food restaurant for which the cluster search is to be conducted. As shown in FIG. 5, the cluster search operation controller 47 is able to retrieve the map data from the map memory 34 and map data storage 31 for the specified search area.

The cluster search operation controller 47 defines a search template and a search increment for scanning the search area. During the scanning, the cluster search operation controller 47 changes the position of the search template at each scan step (increment) and counts the number of POIs within the search template. In an actual implementation, the scanning operation will be performed on the map data by accessing the map memory 34 based on the scanning order and reading the POI data therefrom. As a result of the scanning procedure, the cluster search operation controller 47 produces an object (POI) distribution matrix of the search area, which will be preferably stored in the buffer memory 48.

The cluster search operation controller 47 applies an algorithm (cluster search algorithm) for determining relative spatial density of the POIs in the search area. The details of the cluster search algorithm and the image of the resultant data (cluster distribution matrix) are shown in FIGS. 9A-9M. The object distribution matrix and other data needed for the cluster search algorithms can be temporarily stored in the buffer memory 48.

At the end of this procedure, the cluster search operation controller 47 produces a cluster distribution matrix indicating locations and sizes of the cluster within the search area. Each cluster in the matrix includes one or more POIs of the selected type. The cluster search operation controller 47 causes the monitor 50 to display the results of the cluster search sorted by the cluster size (number of POIs) or the cluster distance from the current user location. Upon receiving a request from the user, the cluster search operation controller 47 causes the monitor 50 to display a map image of the selected cluster or a name list of the POIs within the selected cluster, or the like.

Figure 6:
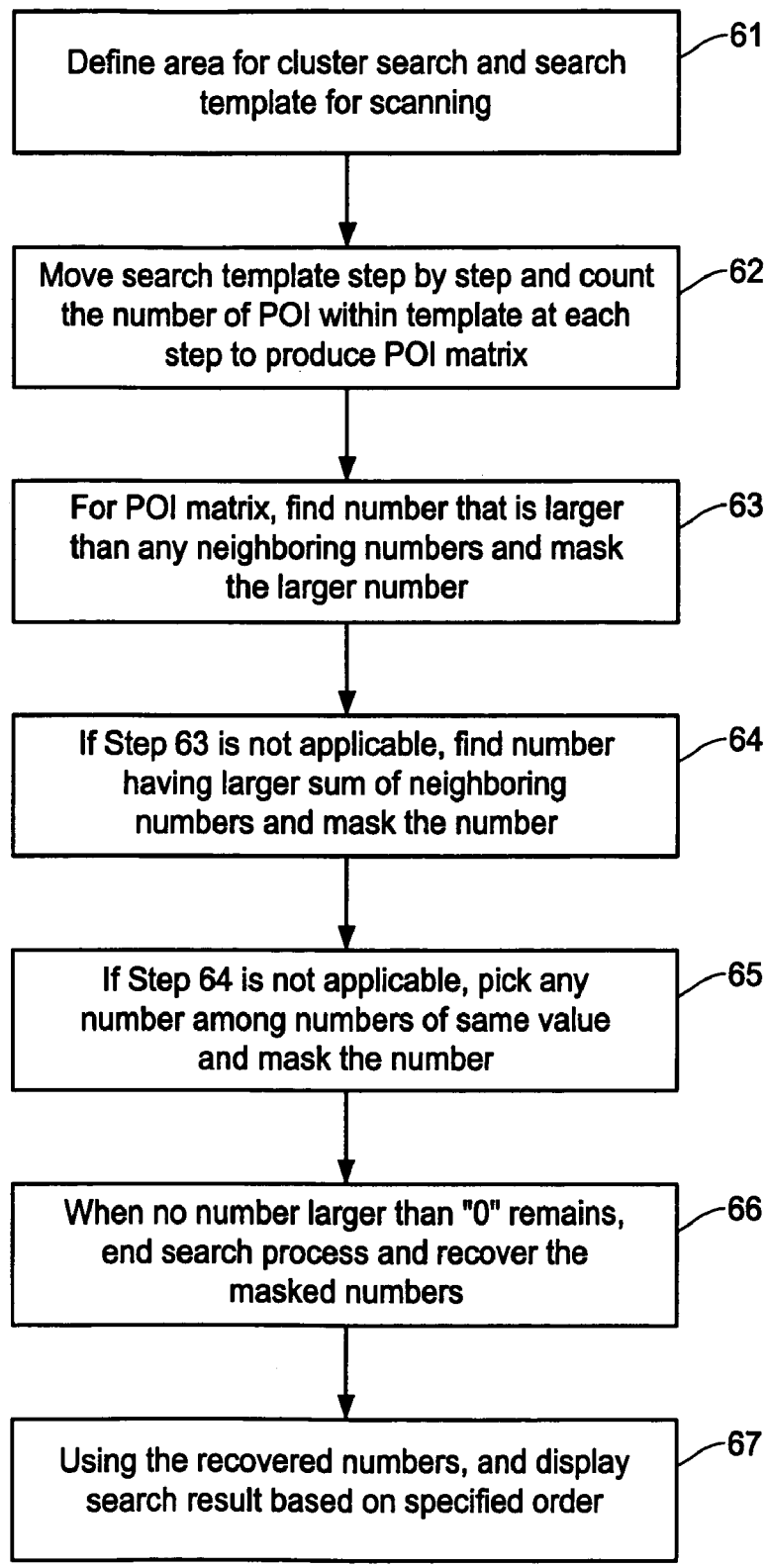
FIG. 6 is a flow chart showing the operational process for finding objects such as points of interest based on the cluster size in the present invention.

As noted above, the navigation system of the present invention applies the cluster search algorithm to find out groups of objects such as POIs based on their relative spatial density, i.e., the cluster size in the search area. FIG. 6 is a flow chart showing a basic operational process of the present invention for conducting the cluster search of POIs in the present invention. More detailed operations of the cluster search in the present invention will be described with reference to FIGS. 8A-8B and 9A-9M.

In the flow chart of FIG. 6, at step 61, the process defines a search area for the cluster search and a cluster template to count POIs in the search area. Generally, the search area is specified by the user. For example, a size and location of the area for the cluster search may be a remote city or a city in which the user is currently located, a relatively small area with many POIs such as downtown, or any area specified by the user. The navigation system scans the search template on the search area for counting POIs within the search template by checking the map data which include POI data and position data. Typically, a type of POIs to be searched is specified before the step 61 to detect only the selected category of POI.

When scanning the search template, each scanning step (increment) of the search template, i.e., a distance between the two steps is set to be smaller than the size of the search template. By scanning the search template and counting the number of POIs at each location of the search template throughout the search area, the navigation system produces a matrix of POI distribution (object distribution matrix) at step 62. The POI distribution matrix lists the total number of POIs within the search template at each location on the search area. In other words, since the search template is larger than the minimum step of the scan, the numbers of POIs in the POI distribution matrix are overlapped.

In step 63, the navigation system applies a cluster search algorithm to the POI distribution matrix to search a number that is larger than any of the neighboring numbers. The highest number at the center are masked and neighboring numbers are erased. This process is performed for all of the numbers on the POI distribution matrix. On the resultant matrix, the navigation system repeats the search process of step 63 until there is no number that is larger than any of the neighboring numbers.

If the method in the step 63 is not applicable to the remaining matrix, i.e., if there is no number that is larger than any neighboring numbers, in other words, there are numbers of equal value, at step 64, the navigation system finds a number having a larger sum of neighboring numbers. The number having the largest sum is masked and the neighboring numbers are erased. Further, if the method in the step 64 is not applicable to the remaining matrix, i.e., if there is no number having the larger sum of neighboring numbers, in step 65, the navigation system picks any number having equal value and masks the number.

The navigation system repeats the above noted steps until all of the numbers in the POI distribution matrix are either masked, erased, or predetermined number such as "0". Then, at step 66, the navigation system recovers the masked numbers at the corresponding locations on the POI distribution matrix. The recovered numbers and their locations show the result of the POI cluster search, the result of which is displayed on the screen at step 67.

Figures 7A, 7B:
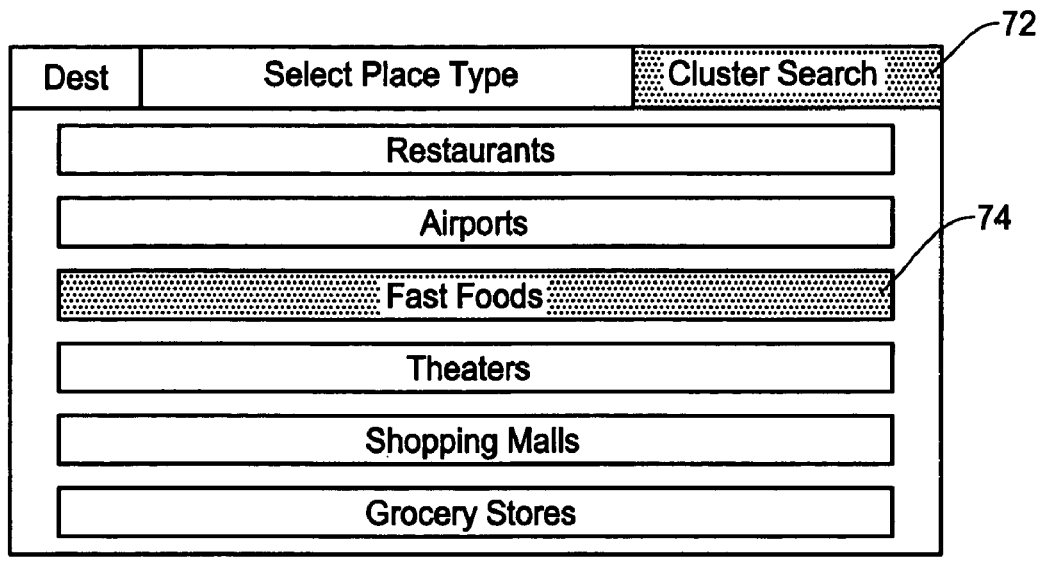
FIGS. 7A and 7B are schematic diagrams showing an example of display screen of the navigation system which lists POI names in the selected type which are sorted by the cluster size in accordance with the present invention.

FIGS. 7A and 7B are schematic diagrams showing an example of display screen of the navigation system associated with the cluster search of the present invention. Suppose the user selects the "Point of Interest (POI)" method in the process of FIG. 1C for finding a destination and selects the "Place Type" key in FIG. 1D, the navigation system of the present invention will display a screen listing the types of POI. In this example, the screen includes a "Cluster Search" key 72 in addition to the list of POI types.

Suppose the user selects a "Fast Food Restaurant" bar 74 as a POI type and presses the "Cluster Search" key 72, the navigation system starts the cluster search of the present invention. The cluster search will examine the relative spatial density of the selected type of POI, in this case, fast food restaurants, for the search area. As noted above with respect to the flow chart of FIG. 6, and as will be described in more detail later, the navigation system produces a POI distribution matrix first and applies the cluster search algorithm to the POI distribution matrix.

Figures 2, 3:
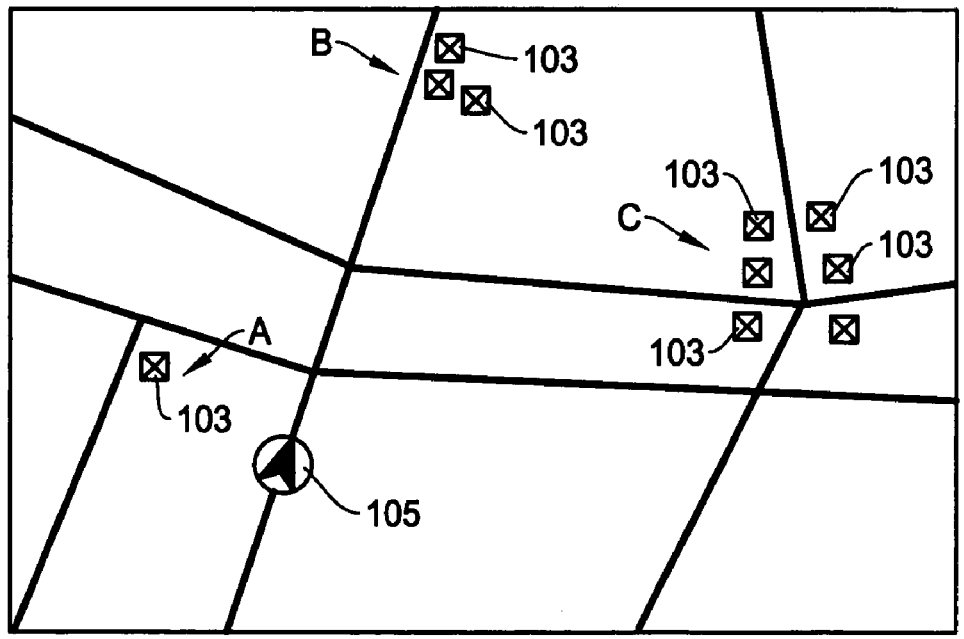
FIG. 2 is a schematic diagram showing an example of screen in the conventional navigation system in which the navigation system lists place names of selected POI type sorted by distance from the user's current position.
FIG. 3 is a schematic diagram showing an example of a situation where one or more points of interest exist at different locations with different degree of density or cluster size for which the navigation system of the present invention is advantageously used.

FIG. 7B shows an example of display of the navigation system illustrating the result of the cluster search for the fast food restaurants. This example lists the clusters of selected POI type (fast food restaurant) sorted by the cluster size. Thus, each bar 80 indicates the cluster of POIs (fast food restaurants) unlike the example of FIG. 2 in which each bar indicates a name of each POI. For example, the first bar in FIG. 7B is the largest cluster having 14 fast food restaurants in which "Taco Bell" is located about the center of the cluster. Each bar also shows the distance and direction to the cluster from the current user position. Other types of display showing the results of the cluster search will be described later.

Figure 8A:
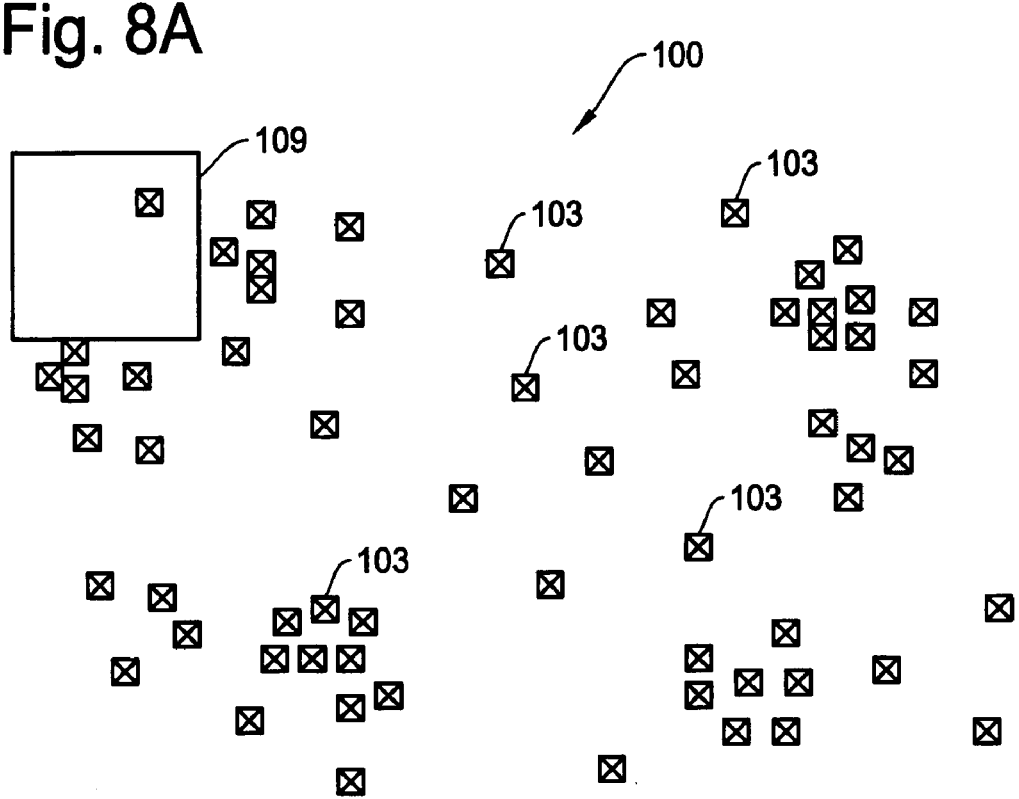
FIGS. 8A and 8B are schematic diagrams showing an example of procedure to produce a matrix of points of interest (POI distribution matrix) in a search area using a search template.
Figure 8B:
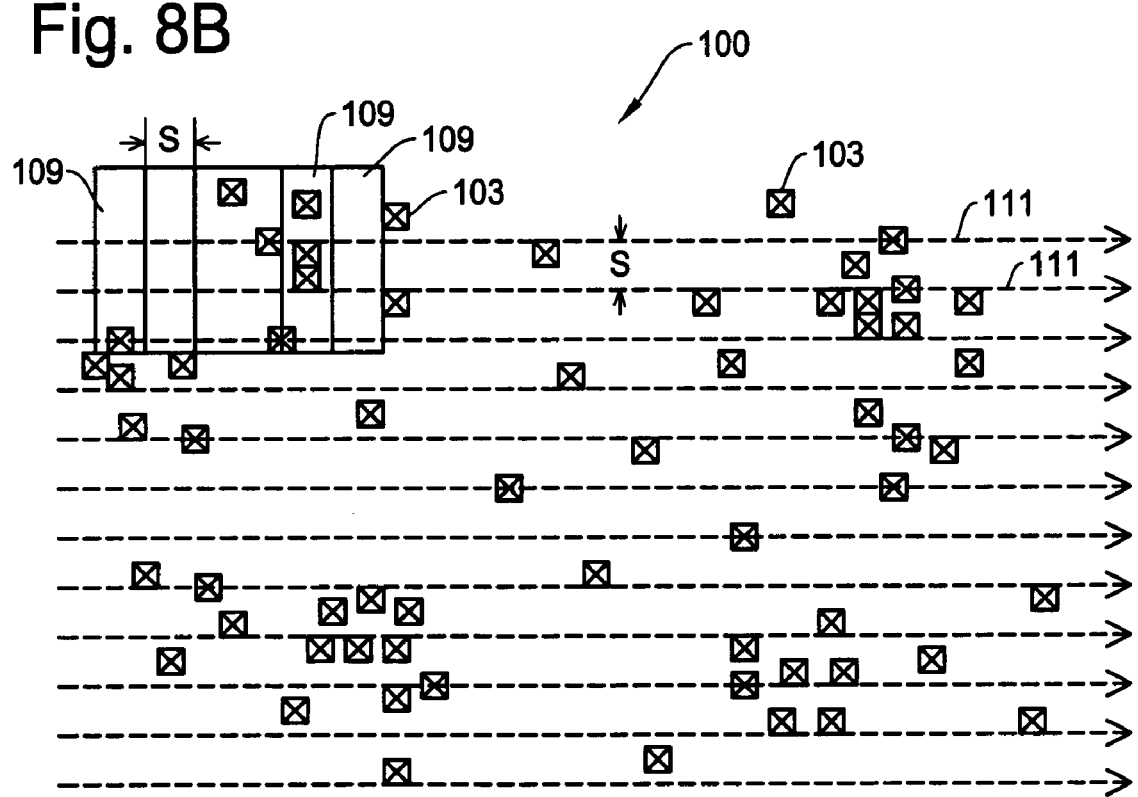

FIGS. 8A and 8B are schematic diagrams showing an example of procedure to produce a distribution matrix of object such as POIs (points of interest) within a search area using a search template. Other example of objects suitable for the present invention includes intersections, specific type of road segments, large structures represented by polygon data, etc. Since the POIs are typical example for applying the cluster search of the present invention, the following description is made mainly for the case of finding POIs in the specified search area.

FIG. 8A shows an example of distribution of POIs 103 in a search area 100 and a search template 109. Before starting this procedure, typically, a user specifies a type of POIs such as fast food restaurants. Thus, the POIs 103 in FIGS. 8A and 8B indicate the distribution of the selected type of POIs, fast food restaurants, in the search area. Typically, the search area is specified by the user, for example, by inputting a name of the city or by moving a cursor on a map image, etc. It is also possible to preset the search range (ex. 5 miles from the current vehicle position) in the navigation system.

The navigation system scans the search template 109 on the search area 100 for counting the number of POIs within the search template 109 as indicated by scanning lines 111. In an actual implementation, such scanning is conducted, for example, by reading the map data within the search area 100 step by step. As shown in FIG. 8B, preferably, the scanning steps S in the horizontal direction and vertical direction are the same, and the size of the search template 109 is larger than the scanning step. The shape of the search template 109 is square or rectangular, although other shape such as a circle or a polygon is also possible. In this example, the length of each side of the search template 109 is about three times larger than the scanning step S. Typically, the shape and size of the search template will be preset in the navigation system.

The navigation system moves the search template 109 at each increment (scanning step S) following the scanning line 111 and acquire the total number of POIs in the selected type within the search template 109. The retrieved data and position data are stored in a memory such as the buffer memory 48 in FIGS. 4 and 5. When the search template 109 reaches the right end, the search template 109 moves back to the left end and scans the second row in the right direction. Alternatively, the search template 109 immediately goes down to the second row and scans in the left direction. The navigation system repeats this procedure until the template 109 covers and counts the number of POIs for the entire search area 100.

Figures 9D, 9E:
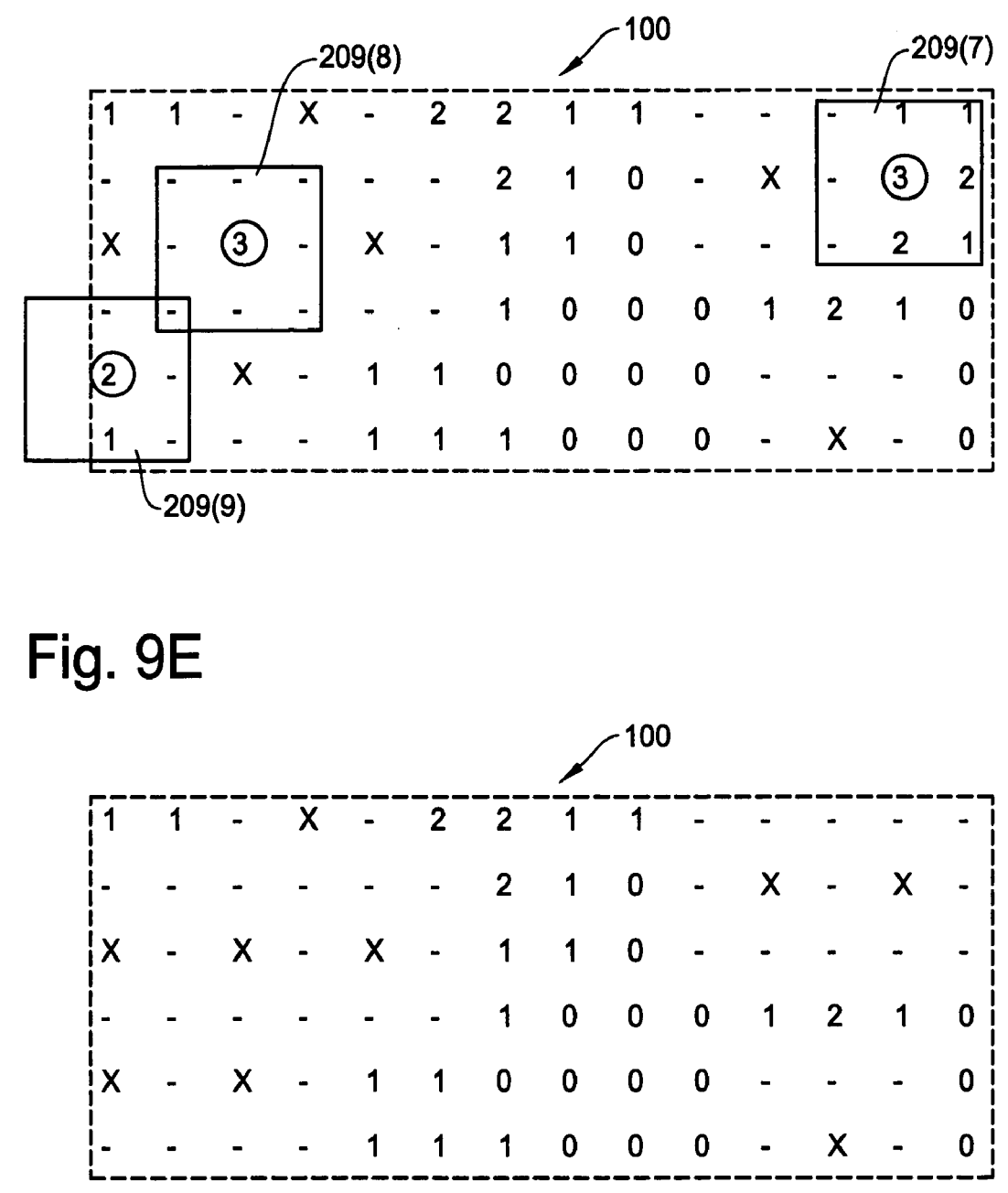
Figure 9H:
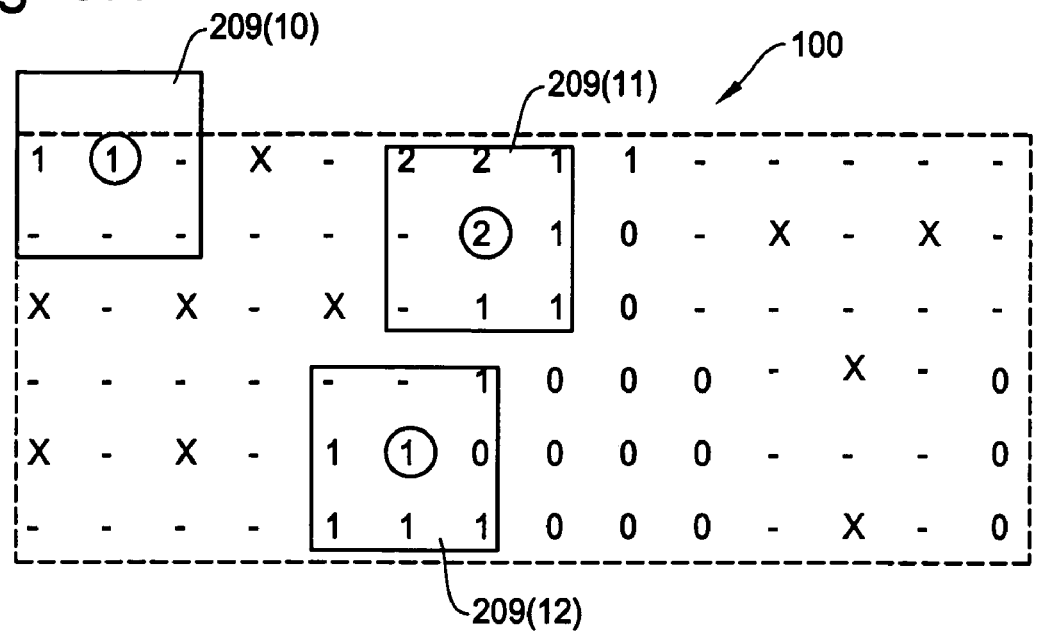

FIGS. 9A-9M are schematic diagrams showing an example of process for conducting the cluster search of POIs for the search area 100 based on the POI distribution matrix obtained by the process of FIGS. 8A and 8B. As a result of the scanning procedure of FIGS. 8A and 8B, the navigation system produces a POI distribution matrix for the search area 100 as shown in FIG. 9A. The navigation system performs the cluster search algorithm of the present invention on the POI distribution matrix of FIG. 9A as described in detail with reference FIGS. 9A-9M.

As noted above, the POI distribution matrix lists the total number of POIs within the search template 100 at each scanning location on the search area 100. Since the search template 109 is much larger than the scanning step S as shown in FIG. 8B, the numbers of POIs in the POI distribution matrix are overlapped. Thus, it should be noted that the POI distribution matrix of FIG. 9A is not exactly the same as the actual distribution of the POIs in the search area. In other words, the POI distribution matrix of FIG. 9A is produced only for the purpose of performing the cluster search algorithm of the present invention. The numbers in the distribution matrix indicate the number of POIs located within the search template 109 for each displacement (scanning step). Thus, the larger the number, the more likely that the POIs are found around the location.

FIGS. 9B to 9L show an example of detailed procedure of the cluster search of the present invention applied to the POI distribution matrix of FIG. 9A for the search area 100. Through the cluster search algorithm, the navigation system of the present invention attempts to find the center of clustered areas where one or more POIs are concentrated. In FIG. 9B, the navigation system finds the numbers in the matrix that do not have larger immediate neighbors.

In this example, the number that is larger than any immediately neighboring numbers is marked by a circle. A square mark 209 on the POI matrix shows a range of the locations of the number affected by each comparison. Thus, immediate neighbors are surrounded by the square mark 209 for ease of explanation. For example, at the upper left of the search area 100, the number "3" in the square mark 209(1) is larger than any of the neighboring numbers.

Similarly, the number "5" in the square mark 209(2) at the upper right of the search area 100 is larger than any of the neighboring numbers. Similarly, the number "5" in the square mark 209(5) at the lower left of the search area 100 is larger than any of the neighboring numbers. In this example, as noted above, only the immediate neighbors are compared with the number at the center. However, it is also feasible to use a larger area for comparing the number at the center and immediately as well as indirectly neighboring numbers surrounding the center number.

In the process of FIG. 9B, the navigation system has found six numbers that are larger than any of the immediately neighboring numbers. In the above process, there may arise a case in which the navigation system cannot find any number that is larger than any neighboring numbers. In such a case, the cluster search algorithm uses a modified rule in which the navigation system will find a number that has a larger sum of neighboring numbers as will be explained later with reference to FIGS. 9H and 9I.

For the result of the procedure of FIG. 9B, the navigation system of the present invention masks the numbers (with circles) that are larger than any immediately neighboring numbers as candidate numbers. In FIG. 9C, the masked numbers are represented by marks "X" in the POI distribution matrix. Thus, the number "3" in the square mark 209(1) at upper left of the search area 100 in FIG. 9B is now marked "X", and the number "5" in the square mark 209(2) at the upper right of the search area 100 in FIG. 9B is now marked "X", and the like. Further, the neighboring numbers in the squire marks are erased as indicated by "−" signs throughout the drawings.

The navigation system repeats this procedure described above until all numbers are finally either erased (marked "−"), masked (marked "X"), predetermined numbers such as "0". Therefore, in FIG. 9D, the navigation system performs the process similar to that of FIG. 9B on the result of FIG. 9C. The numbers that are larger than any immediately neighboring numbers are circled. The squire marks 209 indicate the range of the immediately neighboring numbers surrounding the larger number at the center.

For example, the number "3" in the square mark 209(7) at the upper right of the search area 100 is larger than any neighboring numbers, and the number "2" in the square mark 209(9) at the lower left of the search area 100 is larger than any neighboring numbers, and the like. In the process of FIG. 9D, the navigation system has found three (3) candidate numbers as represented by the circles.

FIG. 9E shows the result of the process of FIG. 9D in which the larger numbers are masked which are indicated by the marks "X" and the neighboring numbers are erased which are indicated by the "−" signs. The erased numbers represented by the "−" signs are regarded as if they are "0" or do no exist. Since the numbers larger than "0" still exist in the resultant matrix of FIG. 9E, the navigation system continues the above procedure on the matrix. It should be noted that, although this example uses the number "0", any small number appropriate for a particular application such as equal to or smaller than "1" can be used.

FIG. 9F shows the next step of cluster search applied to the matrix of FIG. 9E for finding numbers that are larger than any neighboring numbers. The numbers that have the largest value compared to surrounding neighboring numbers are selected as candidates. In this example, there is only one candidate in the matrix which is represented by a circle within the squire mark 209. The result of the process of FIG. 9F is shown in the matrix of FIG. 9G, in which the candidate number "2" is masked as indicated by the mark "X" and its immediately neighboring numbers are erased as indicated by the "−" signs.

Since the numbers larger than "0" still exist in the resultant matrix of FIG. 9G, the navigation system continues the above procedure on the matrix. However, during the procedure of finding the largest number as noted above, there arises a case where there is no number that is larger than any neighboring numbers. Such a situation is shown in FIG. 9H which is indicated by square marks 209. There is no number that is larger than any neighboring numbers because the larger number has the same value such as "2" as those in the neighboring numbers.

Then, the cluster search algorithm of the present invention modifies the search method so that the navigation system will find the number that has the larger sum of neighboring numbers. For example, in the matrix of FIG. 9H, there are three numbers with the value "2" in the square mark 209(11). First, the number "2" at the top left in the square mark 209(11) has a sum of 4 resulted from (2+2). Secondly, the number "2" at the top center in the square mark 209(11) has a sum of 6 resulted from (2+2+1+1). Lastly, the number "2" at the center of the square mark 209(11) has a sum of 8 resulted from (2+2+1+1+1+1).

As a result, in the above example, the number "2" at the center of the square mark 209(11) is selected as a candidate because it has the largest sum of neighboring numbers. Similarly, the number "1" at the center of the square mark 209(12) is selected because this number has the largest sum of the neighboring numbers. However, this rule may not always applicable because there may be a situation in which the sums of the neighboring numbers become the same.

Namely, in the case where two or more numbers have the same sum of the neighboring numbers, the navigation system selects any one of the numbers among them. For instance, there are two numbers with the value "1" in the square mark 209(10) at the upper left of FIG. 9H. The sums of the neighboring numbers for both numbers are the same. Either one of the numbers can be selected as a candidate. In this example, the number at the right is selected as a candidate although the number at the left could equally be a candidate as well. The navigation system of the present invention masks the candidate numbers as represented by the mark "X" and their neighboring numbers are erased as represented by the "−" sign in FIG. 9I.

Figure 9I:
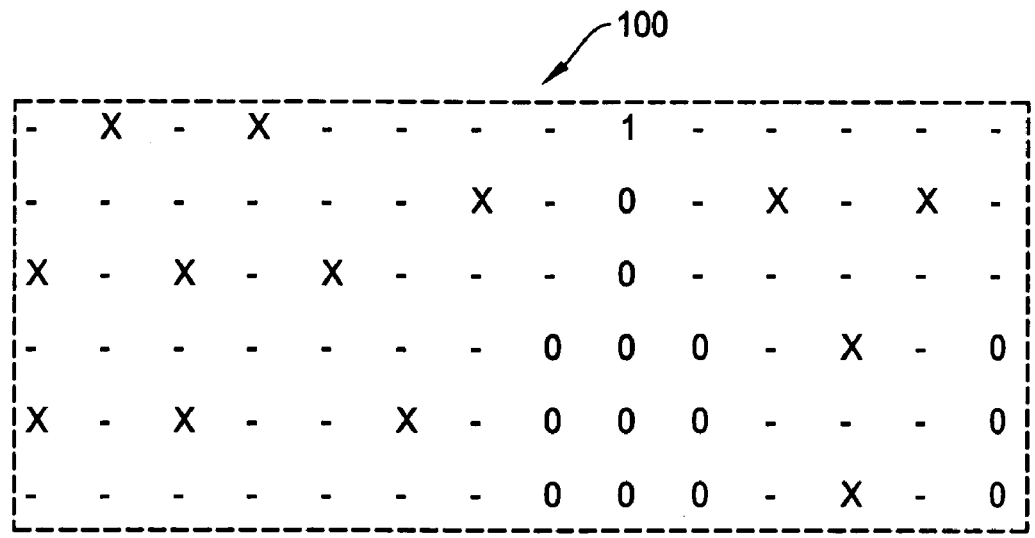
Figure 9J:
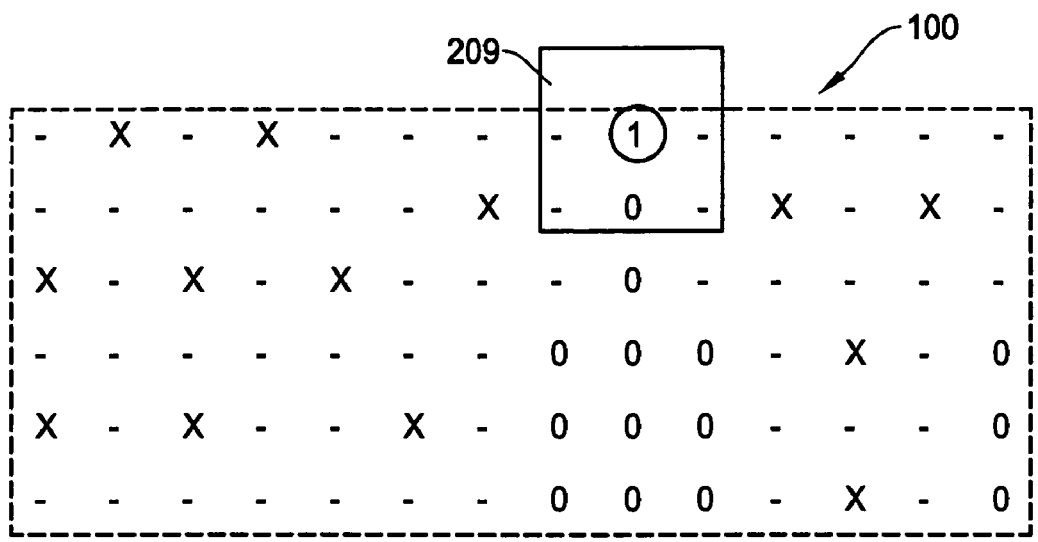
Figure 9K:
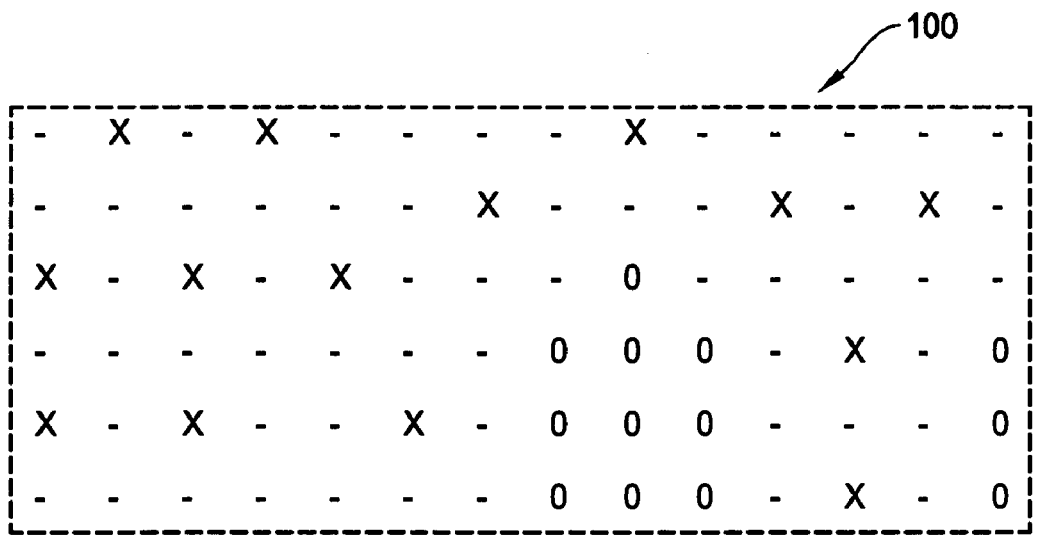

Since the number larger than "0" still exists in the resultant matrix of FIG. 9I, the navigation system continues the above procedure on the matrix as in the process of FIG. 9J. In the example of FIG. 9J, there is one candidate number "1" that has the larger value than any neighboring numbers. Thus, as shown in FIG. 9K, the candidate number is masked by the mark "X" and its neighboring numbers are erased as indicated by the "−" signs. In the matrix of FIG. 9K, there are only the masked numbers (marked by "X"), the erased numbers (marked by "−"), and the numbers with value "0". Thus, the navigation system ends the cluster search operation. Although the foregoing example uses the number "0", any small number appropriate for a particular application such as equal to or smaller than "1" can be used. Thus, it is also possible to end the cluster search algorithm when any remaining numbers on the distribution matrix is "1" or "0".

Figure 9L:
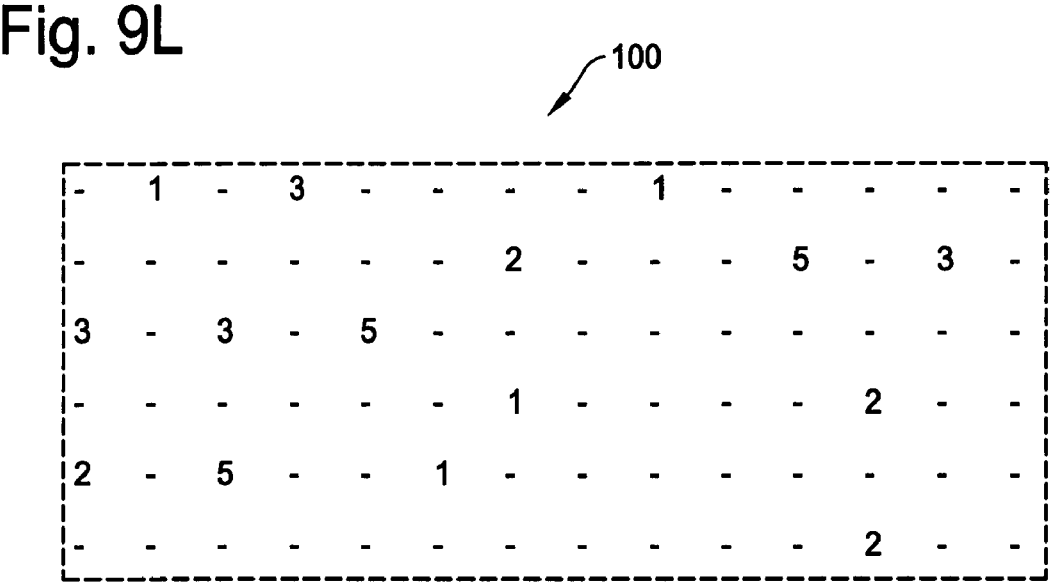
Figure 9M:
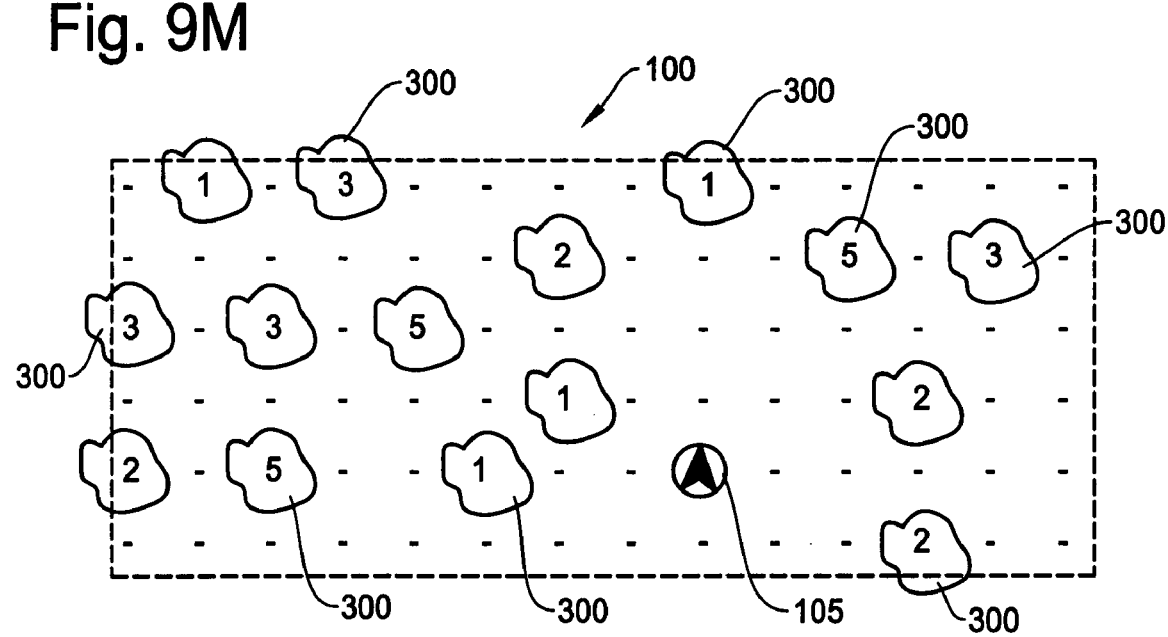

Then, the navigation system recovers the masked numbers at the corresponding position marked by "X" as shown in FIG. 9L. The recovered values represent the cluster size, i.e., the number of POIs, at each small area (cluster) within the search area 100. FIG. 9M shows an image of distribution of clusters in the search area 100, i.e., a cluster distribution matrix indicating locations and sizes of the cluster. Each cluster 300 in the cluster distribution matrix includes one or more POIs of the selected type. When the result of the cluster search is displayed in the order of cluster size as in FIG. 7B, the clusters will be sorted based on the numbers shown in the clusters. When the result of the cluster search is displayed in the order of distance, the clusters will be sorted by the distance from the current vehicle position 105 illustrated in the FIG. 9M.

Figures 10A, 10B:
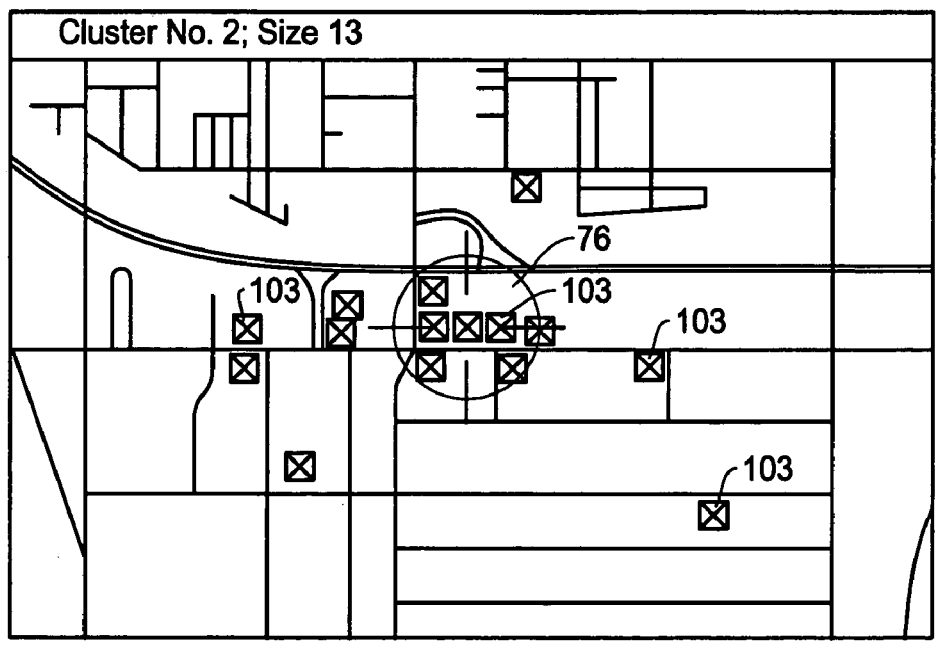
FIGS. 10A-10B show another example of screen display of the navigation system of the present invention illustrating the results of cluster search.

As noted above, the result of the cluster search is displayed by the display example shown in FIG. 7B. FIGS. 10A-10B and 11A-11B show other example of screen display of the navigation system of the present invention. The example of FIG. 10A is a basic display showing the result of the cluster search. This screen example is similar to that shown in FIG. 7B by listing the clusters of POIs either by the order of cluster size or the distance from the current position of the user. Each cluster is represented by the POI name at the center of the cluster. Also in this example, each cluster is provided with a cluster number.

In addition to the screen example of FIG. 7B, the display example of FIG. 10A includes a "View on Map" key 82 and a "List Within Cluster" key 84. The "View on Map" key 82 is to watch the map image of the selected cluster, i.e., each location of the POI within the cluster on the map image. The "List Within Cluster" key 84 is to list the PCI names within the selected cluster in the predetermined manner such as by the order of distance or by the alphabetical order.

In the example of FIG. 10A, suppose the user selects the "cluster number 2" and presses the "View on Map" key 82, the navigation system changes the screen to the map image as shown in FIG. 10B. As noted above, each cluster in FIG. 10A includes the name of the POI in the center of the cluster, in this case "Wendy's". Thus, in FIG. 10B, navigation system shows the distribution of the POIs 103 (fast food restaurants) on the map image of the "cluster number 2" in which "Wendy's" is located at about the center. The example of FIG. 10B also shows a cursor 76 of the navigation system.

FIGS. 11A-11B show another example of displaying the results of the cluster search. The screen of FIG. 11A is basically the same as that of FIG. 10A although the user selects the "List Within Cluster" key 84. Then, the navigation system displays the POI name list within the selected cluster (cluster number 2) as shown in FIG. 11B. This example lists the POI names sorted by distance from the POI "Wendy's" which is at the center of the cluster (cluster number 2). The name of the center POI "Wendy's" is illustrated by a bold line. It is also possible to list the POI names within the cluster by the alphabetical order.

Figure 12A:
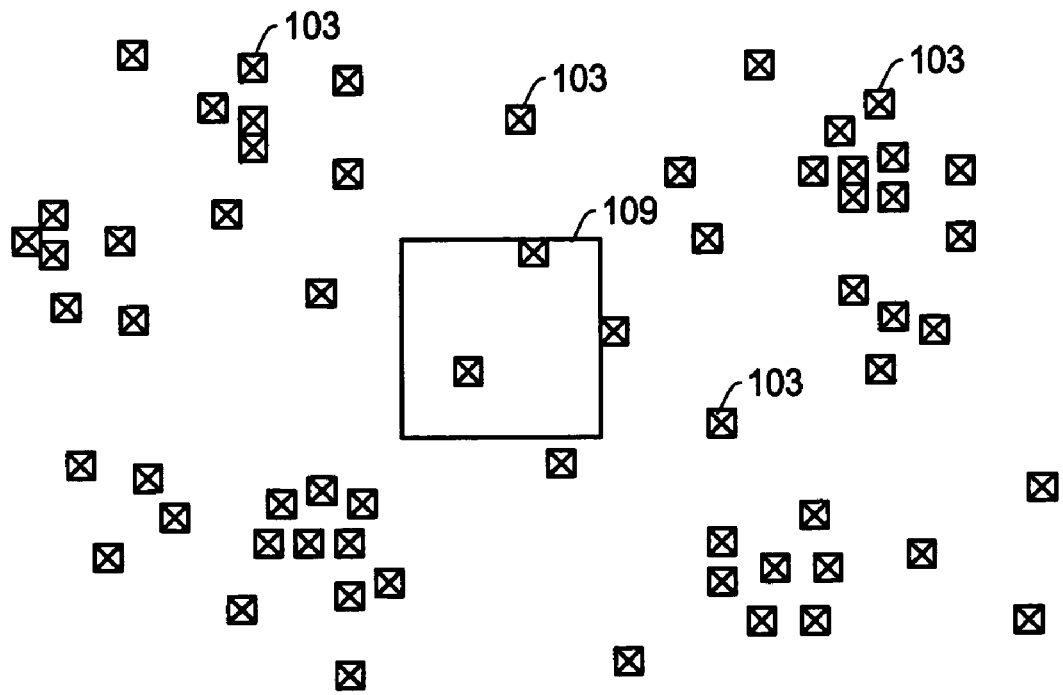
FIGS. 12A-12B are schematic diagrams showing another method of scanning the search template in accordance with the present invention.
Figure 12B:
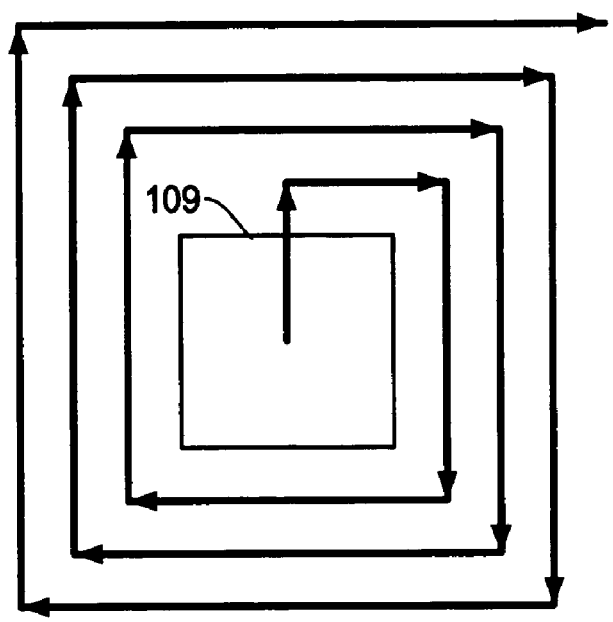

FIGS. 12A and 12B show another example of moving the search template on the search area. In the example of FIGS. 8A and 8B, the navigation system scans the search template 109 on one scanning line from one end of the horizontal position to the other end of the horizontal position. Then, the navigation system vertically shifts the search template to the next scanning line and scans the template from one end of the horizontal position to other end of the horizontal position, and repeats this movements. Thus, the scanning operation in FIGS. 8A and 8B is similar to the one used in television systems.

In the example of FIGS. 12A and 12B, however, the navigation system conducts a spiral scanning or spiral search starting from the center of the search area. Thus, at the start, the search template 109 is located at the center of the search area as shown in FIG. 12A. Starting from the center, the search template moves spirally toward the outer side of the search area step by step to count the number of POIs within the search template 109 as shown in FIG. 12B. In this example, the search template 109 moves in a clockwise direction, although is also possible to move the search template 109 in a counter-clockwise direction.

As noted above, the search area can be freely specified by the user. Thus, the starting position of the search template, i.e., the center of the search area, can be set to a current position of the user. This implementation can be advantageously applied to realize a high speed operation since the cluster search procedure shown in FIGS. 9A-9M is able to start for the POI distribution data around the center area of the search area first without waiting for all of the POI distribution matrix is completed. Thus, the result of the cluster search for the area closer to the user can be displayed quickly, which is usually practical for the user. When the user finds a desired cluster, the navigation system may stop the search.

The cluster search performance in the present invention can be fine-tuned by adjusting the search template size and the displacement increment (scanning step). The present invention can present the results of the cluster search to the user in a way it is useful to the user by sorting the clusters by the cluster size or the cluster distance from the user. The cluster search algorithm of the present invention can be applied to other situation that requires relative spatial density information. For example, the present invention can be applied to a case for finding how densely intersections are positioned. The search area and the search template can be any shape or size as desired.

As has been described above, according to the present invention, the navigation system is able to perform the cluster search for searching objects such as POIs based on their relative spatial density or cluster size within the search area specified by the user. The navigation system displays the results of the cluster search sorted by the cluster size or the distance from the current user location. In response to the request by the user, the navigation system displays a map image of the selected cluster or each name of the POIs within the selected cluster, or the like. In other words, the user can see a distribution of clusters of the POIs within the search area and details of each cluster as to its size, location, map image, and details of each POI in the cluster.

The cluster search of the present invention provides the user a wider choice of destination in such a situation when the user has not a specific place name in mind. For example, there arises a situation where the user wants to eat fast food for lunch but does not have a specific fast restaurant that he really wants to go. In such a case, the navigation system informs the user about the location and size of the cluster having two or more fast food restaurants. The user can select the cluster as his destination so that he can determine which restaurant he likes after arriving at the cluster.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A display method for a navigation system for searching and displaying objects clustered within a search area, comprising the following steps of:
   defining a size and shape of a search template for searching objects in the search area;
   scanning the search template on the search area by displacing its position by a predetermined increment;
   counting and recording a number of objects on the search area within the search template at every increment of said displacement position, thereby creating an object distribution matrix;
   applying a cluster search algorithm to the object distribution matrix, thereby detecting distribution of clusters of the objects in the search area; and
   displaying the clusters of the objects in the search area by a predetermined display method;
   wherein said cluster search algorithm includes the following step of:
      finding numbers on the object distribution matrix that are larger than any neighboring numbers and recording the higher numbers;
      temporarily masking the higher numbers on the object distribution matrix and erasing the neighboring numbers from the object distribution matrix;
      repeating the above operations until any remaining numbers on the object distribution matrix become equal to or smaller than a predetermined value; and
      erasing all the remaining numbers and recovering the masked numbers on the object distribution matrix, thereby obtaining distribution of the clusters of the object in the search area.

2. A display method of clustered objects as defined in claim 1, wherein said objects are points of interest of a specified type within the search area.

3. A display method of clustered objects as defined in claim 1, wherein said predetermined increment for scanning the search template is smaller than the size of the search template so that an area on the search area covered by the search template is overlapped by consecutive increments of said displacement position.

4. A display method of clustered objects as defined in claim 1, wherein said step of finding numbers on the object distribution matrix includes the following steps of:
   selecting a number having a larger sum of neighboring numbers when a number larger than any neighboring numbers is not found; and
   temporarily masking the selected number on the object distribution matrix and erasing the neighboring numbers from the object distribution matrix.

5. A display method of clustered objects as defined in claim 1, wherein said step of finding numbers on the object distribution matrix includes the following steps of:
   selecting a number having a larger sum of neighboring numbers when a number larger than any neighboring numbers is not found;
   temporarily masking the selected number on the object distribution matrix and erasing the neighboring numbers from the object distribution matrix;
   picking either one of the numbers having equal sums of neighboring numbers when a number having the larger sum of neighboring numbers is not found; and
   temporarily masking the picked number on the object distribution matrix and erasing the neighboring numbers from the object distribution matrix.

6. A display method of clustered objects as defined in claim 1, wherein said search template has a square shape and a side length of the search template is larger than said predetermined increment of displacement by three times or more.

7. A display method of clustered objects as defined in claim 1, wherein said step of displaying the clusters of the objects in the search area includes a step of listing the clusters of objects in an order of cluster size where the cluster size is a number of the objects in a small portion in the search area.

8. A display method of clustered objects as defined in claim 1, wherein said step of displaying the clusters of the objects in the search area includes a step of listing the clusters of objects in an order of distance from a current user position.

9. A display method of clustered objects as defined in claim 1, wherein said step of displaying the clusters of the objects in the search area includes a step of listing names of the objects within a specified cluster thereby allowing the user to select one of the objects.

10. A display method of clustered objects as defined in claim 9, wherein said step of listing the names of the objects within the selected cluster includes a step of listing the names in an order of distance from an object located at a center of the selected cluster or an alphabetical order of the names of the objects.

11. A display method of clustered objects as defined in claim 1, wherein said step of displaying the clusters of the objects in the search area includes a step of displaying a map image showing distribution of the objects within a selected cluster.

12. A display method of clustered objects as defined in claim 1, wherein said step of scanning the search template on the search area includes a step of moving the search template from one horizontal end to another horizontal end of the search area for a particular row and vertically shifting to a next row, and repeating the above movements to cover all the search area to produce the object distribution matrix.

13. A display method of clustered objects as defined in claim 1, wherein said step of scanning the search template on the search area includes a step of moving the search template starting from a center of the search area and spirally moving the search template around the center toward an outer area of the search area.

14. A display method of clustered objects as defined in claim 13, wherein said step of applying said cluster search algorithm starts as soon as sufficient data of object distribution at a center portion of the search area is available without waiting for completing the scanning step for all of the search area.

15. A display apparatus for a navigation system for searching and displaying objects clustered within a search area, comprising:
    means for defining a size and shape of a search template for searching objects in the search area;
    means for scanning the search template on the search area by displacing its position by a predetermined increment;
    means for counting and recording a number of objects on the search area within the search template at every increment of said displacement position, thereby creating an object distribution matrix;
    means for applying a cluster search algorithm to the object distribution matrix, thereby detecting distribution of clusters of the objects in the search area; and
    means for displaying the clusters of the objects in the search area by a predetermined display method;
    wherein said means for applying the cluster search algorithm includes:
        means for finding numbers on the object distribution matrix that are larger than any neighboring numbers and recording the higher numbers;
        means for temporarily masking the higher numbers on the object distribution matrix and erasing the neighboring numbers from the object distribution matrix;
        means for repeating the above operations until any remaining numbers on the object distribution matrix become equal to or smaller than a predetermined value; and
        means for erasing all the remaining numbers and recovering the masked numbers on the object distribution matrix, thereby obtaining distribution of the clusters of the object in the search area.

16. A display apparatus of clustered objects as defined in claim 15, wherein said objects are points of interest of a specified type within the search area.

17. A display apparatus of clustered objects as defined in claim 15, wherein said predetermined increment for scanning the search template is smaller than the size of the search template so that an area on the search area covered by the search template is overlapped by consecutive increments of said displacement position.

18. A display apparatus of clustered objects as defined in claim 15, wherein said means for finding numbers on the object distribution matrix includes:
    means for selecting a number having a larger sum of neighboring numbers when a number larger than any neighboring numbers is not found; and
    means for temporarily masking the selected number on the object distribution matrix and erasing the neighboring numbers from the object distribution matrix.

19. A display apparatus of clustered objects as defined in claim 15, wherein said means for finding numbers on the object distribution matrix includes:
    means for selecting a number having a larger sum of neighboring numbers when a number larger than any neighboring numbers is not found;
    means for temporarily masking the selected number on the object distribution matrix and erasing the neighboring numbers from the object distribution matrix;
    means for picking either one of the numbers having equal sums of neighboring numbers when a number having the larger sum of neighboring numbers is not found; and
    means for temporarily masking the picked number on the object distribution matrix and erasing the neighboring numbers from the object distribution matrix.

20. A display apparatus of clustered objects as defined in claim 15, wherein said search template has a square shape and a side length of the search template is larger than said predetermined increment of displacement by three times or more.

21. A display apparatus of clustered objects as defined in claim 15, wherein said means for displaying the clusters of the objects in the search area includes means for listing the clusters of objects in an order of cluster size where the cluster size is a number of the objects in a small portion in the search area.

22. A display apparatus of clustered objects as defined in claim 15, wherein said means for displaying the clusters of the objects in the search area includes means for listing the clusters of objects in an order of distance from a current user position.

23. A display apparatus of clustered objects as defined in claim 15, wherein said means for displaying the clusters of the objects in the search area includes means for listing names of the objects within a specified cluster thereby allowing the user to select one of the objects.

24. A display apparatus of clustered objects as defined in claim 23, wherein said means for listing the names of the objects within the selected cluster includes means for listing the names in an order of distance from an object located at a center of the selected cluster or an alphabetical order of the names of the objects.

25. A display apparatus of clustered objects as defined in claim 15, wherein said means for displaying the clusters of the objects in the search area includes means for displaying a map image showing distribution of the objects within a selected cluster.

26. A display apparatus of clustered objects as defined in claim 15, wherein said means for scanning the search template on the search area includes means for moving the search template from one horizontal end to another horizontal end of the search area for a particular row and vertically shifting to a next row, and repeating the above movements to cover all the search area to produce the object distribution matrix.

27. A display apparatus of clustered objects as defined in claim 15, wherein said means for scanning the search template on the search area includes means for moving the search template starting from a center of the search area and spirally moving the search template around the center toward an outer area of the search area.

28. A display apparatus of clustered objects as defined in claim 27, wherein said means for applying said cluster search algorithm starts as soon as sufficient data of object distribution at a center portion of the search area is available without waiting for completing the scanning step for all of the search area.

\* \* \* \* \*